LUMINESCENT PHOSPHOR

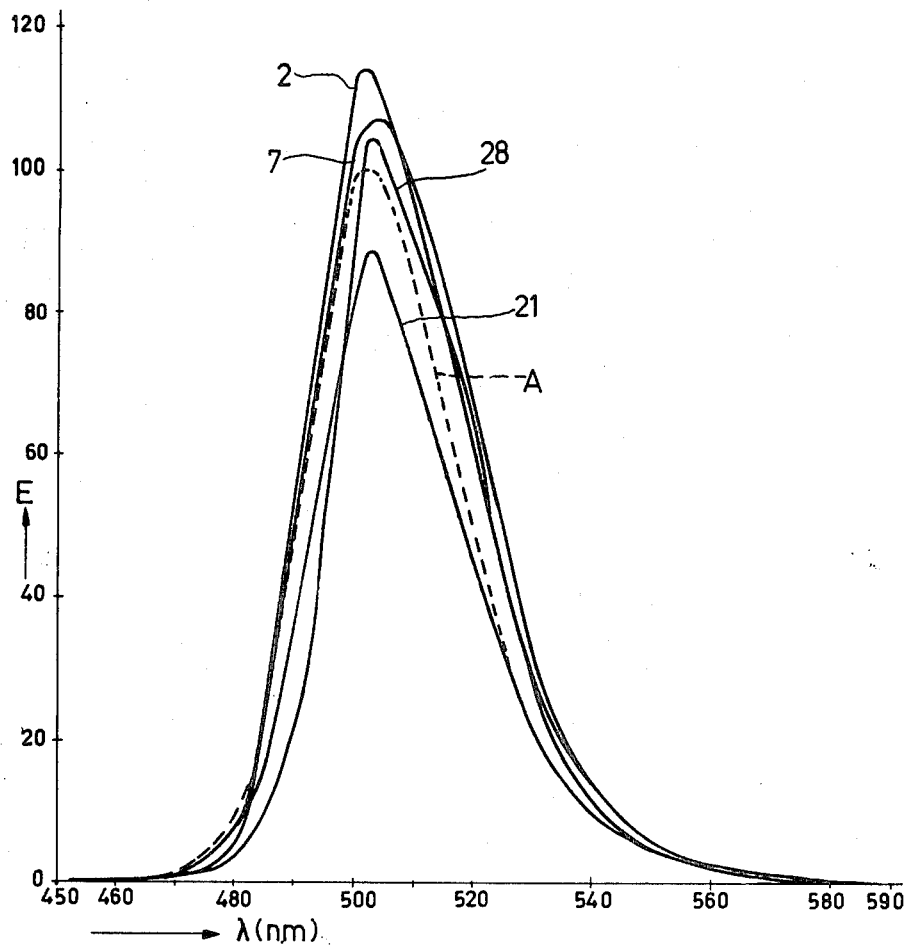

Willem Lambertus Wanmaker and Johannus Godefridus Verlijsdonk, Emmasingel, Eindhoven, Netherlands, assignors to U.S. Philips Corporation, New York, N.Y.
Filed Apr. 20, 1970, Ser. No. 30,141
Claims priority, application Netherlands, Apr. 23, 1969, 6906222
Int. Cl. C09k 1/04, 1/68
U.S. Cl. 252—301.6 R  1 Claim

ABSTRACT OF THE DISCLOSURE

Luminescent gallate activated by bivalent manganese and having the spinel crystal structure, defined by the formula $$p(Mg_xLi_{0.5y}Ga_{0.5y}Zn_zO) \cdot Ga_{2-a}Al_aO_3 \cdot bMnO$$

wherein:
$x+y+z=1$
$0 \leq a \leq 1.0$
$0 \leq x \leq 0.96$
$0 \leq y \leq 0.95$
$0 \leq z \leq 1.00$, wherein $0.05 \leq a \leq 1.0$ if $0.90 < z \leq 1.00$ and wherein
$0.75 \leq p \leq 1.10$
$0.002 \leq b \leq 0.06$ The invention relates to a luminescent screen provided with a luminescent gallate activated by bivalent manganese and having the spinel crystal structure. Furthermore the invention relates to a gas-discharge lamp provided with such a luminescent screen and to such a luminescent gallate.

United Kingdom patent specification 1,105,233 describes the luminescence of magnesium gallate activated by bivalent manganese upon excitation by ultraviolet radiation. Furthermore, inter alia, the manganese-activated luminescent gallates of magnesium, lithium and zinc, respectively are known from the article by C. W. W. Hoffman and J. J. Brown in J. Inorg. Nucl. Chem., 30, 63–69 (1968). The fundamental lattices of the said gallates may be represented by the formulae $MgGa_2O_4$, $LiGa_5O_8$, $ZnGa_2O_4$ and have the spinel crystal structure. These known manganese-activated gallates all have an emission spectrum the maximum of which is located at a wavelength of approximately 510 nm.

It is known from the Netherlands patent application 6702017 to modify manganese-activated magnesium gallate by replacing part of the gallium by aluminum. The spinel structure is then maintained and the spectral distribution of the emitter radiation does not undergo substantially any variations. The replacement of gallium by aluminum in the magnesium gallate results in a slightly lower light output at room temperature. However, the decrease in the light output at a temperature increase is considerably smaller for the aluminum-containing gallates than that for the pure gallate. This better temperature dependence results in the aluminum-containing gallates having a higher light output at comparatively high temperatures than the pure gallate.

A luminescent screen according to the invention provided with a luminescent gallate activated by bivalent manganese and having the spinel crystal structure is characterized in that the gallate is defined by the formula $$p(Mg_xLi_{0.5y}Ga_{0.5y}Zn_zO) \cdot Ga_{2-a}Al_aO_3 \cdot bMnO$$

wherein
$x+y+z=1$
$0 \leq a \leq 1.0$
$0 \leq x \leq 0.96$
$0 \leq y \leq 0.95$
$0 \leq z \leq 1.00$, wherein $0.05 \leq a \leq 1.0$ if $0.90 < z \leq 1.00$ and wherein
$0.75 \leq p \leq 1.10$
$0.002 \leq b \leq 0.06$ A luminescent screen according to the invention comprises a mixed gallate of at least two of the elements magnesium, lithium and zinc or single zinc gallate. If the screen comprises zinc gallate the zinc-content of which is more than 0.9, a part of the gallium must be replaced by aluminum. Such a replacement is not necessary but possible for the other gallates according to the invention. A gallate defined by the above formula and conditions can be satisfactorily excited both by ultraviolet radiation and by electrons, radiation being emitted having a spectral distribution the maximum of which is located at a wavelength of approximately 505 nm., which substantially corresponds to the location of the maximum of the said known gallates.

All mixed gallates in the ternary system constituted by magnesium gallate, lithium gallate and zinc gallate may have the spinel crystal structure. It has been found from experiments which have led to the present invention that the light output of the single manganese-activated gallates from the system can be increased by replacing in the single gallate part of the cation by either of the two or both the other cations from the system. Since both the known lithium gallate and the known zinc gallate have a considerably lower light output than the known magnesium gallate, it could by no means be expected that partial replacement of the magnesium in magnesium gallate by lithium and/or zinc would lead to higher light outputs. In case of partial replacement of lithium in lithium gallate by magnesium and/or zinc and partial replacement of zinc in zinc gallate by magnesium and/or lithium, light outputs are obtained which are comparable to that of the magnesium gallate.

If part of the gallium is replaced by aluminum in the gallates according to the invention, the same advantage as in the known magnesium gallate is obtained, namely a better temperature dependence. For this reason also the aluminum-containing gallates according to the invention are particularly suitable for those uses wherein the luminescent material is at a high temperature. However, unlike the known magnesium gallate where an addition of aluminum results in a lower light output at room temperature, it has been found that partial replacement of gallium by aluminum in the gallates having a high lithium content, for example, for $y > 0.50$, likewise has a favourable effect on the light output at room temperature. In case of partial replacement of gallium by aluminum in the gallates having a high zinc content, for example, for $z>0.50$, this improvement of the light output at room temperature is still greater. Aluminum should be present in the gallates having a zinc content of more than 0.9 because otherwise values of the light outputs are obtained which are less satisfactorily usable in practice. A possible explanation of the improved light output of the aluminum-containing gallates having a high lithium content or a high zinc content is that the manganese serving as the activator can better be built in in the lattice. The value of the aluminum content $a$ is chosen to be not more than 1.0 because otherwise no luminescent materials which are usable in practice are obtained. Values of $a$ which are not more thtan 0.30 are preferred.

The contents of magnesium, lithium and zinc should be chosen to be within the above-given limits in the mixed gallates according to the invention. Measurements have shown that replacement of a small quantity of magnesium in magnesium gallate and of lithium in lithium gallate and of zinc in zinc gallate already gives rise to a considerable increase in the light output.

The highest values for the light output are found in gallates according to the invention wherein the zinc content is not more than 0.30 and the magnesium content is not less than 0.20.

The composition of the luminescent gallates according to the invention may slightly deviate from the ratios determined by stoichiometry. This becomes manifest in the above-given formula in the factor of $p$ which may assume values of between 0.75 and 1.10. In fact, it has been found from experiments that an excess of one or more of the oxides is often desirable when preparing the luminescent gallates for obtaining a smoothly proceeding reaction between the composite compounds. Such an excess may also contribute to a better formation of the crystal lattice. The excess of the added oxide may remain present in the luminescent material and has little influence on the luminescent properties.

The manganese content $b$ is chosen to be between the above-given limits because then the highest light outputs are obtained. The value of $b$ is preferably chosen to be between 0.008 and 0.04.

A further advantage of the gallates according to the invention is that they can be prepared more easily than the known magnesium gallate which can only be prepared with a great excess of gallium oxide. Due to a greater reactivity of the starting mixture, the firing periods and firing temperatures for the gallates according to the invention can be chosen to be lower.

The paramount use of the gallates according to the invention is found in gas discharge lamps for document reproduction, for the emission colour is particularly suitable for this purpose. Those gallates according to the invention are preferably used wherein $z$ is not more than 0.30 and $x$ is not less than 0.20, because these have the highest light outputs.

When using the gallates according to the invention in low-pressure mercury vapour lamps for document reproduction, the lamp may be formed in known manner as a so-called aperture lamp. This known kind of lamp deviates from an ordinary low-pressure mercury vapour lamp having a luminescent layer in that the luminescent layer is not present over a given width along a generatrix of the lamp. The light produced in the lamp is highly concentrated in this aperture which is desirable for most reproduction devices. The so-called reflection principle may optionally be used both for ordinary fluorescent lamps and for these aperture lamps. When using this principle, a reflecting layer, for example, comprising titanium dioxide is provided between the luminescent layer in the lamp and the envelope.

The luminescent gallates according to the invention form very efficient luminescent materials also when they are excited by electrons. Values of up to 7% have been measured for the energy conversion efficiency upon electron excitation, which is very high for oxidic luminescent materials. When excited by electrons, substantially the same spectral distribution of the emitted radiation is obtained as when excited by ultraviolet radiation.

It is to be noted that the luminescent gallates according to the invention may alternatively be satisfactorily excited by X-ray radiation.

The invention will further be described with reference to two tables, one example and one drawing.

TABLE I

| Example | $p$ | $x$ | $y$ | $z$ | $a$ | $b$ | $LO_{20}$ | $LO_{80}$ | $T_{50}$ in °C. | $\lambda_{max.}$ in nm. |
|---|---|---|---|---|---|---|---|---|---|---|
| A | 0.87 | 1.00 | | | | 0.01 | 100 | 90 | 180 | 503 |
| 1 | 0.96 | 0.95 | 0.05 | | | 0.01 | 106 | 93 | 170 | 504 |
| 2 | 0.96 | 0.90 | 0.10 | | | 0.01 | 107 | 88 | 160 | 503 |
| 3 | 0.96 | 0.90 | 0.10 | | 0.10 | 0.01 | 107 | 101 | 215 | 504 |
| 4 | 0.96 | 0.90 | 0.10 | | 0.40 | 0.01 | 99 | 97 | 270 | 506 |
| 5 | 0.94 | 0.90 | 0.10 | | 0.80 | 0.03 | 69 | 67 | 310 | 522 |
| 6 | 0.96 | 0.50 | 0.50 | | | 0.01 | 103 | 78 | 145 | 503 |
| 7 | 0.96 | 0.50 | 0.50 | | 0.10 | 0.01 | 109 | 100 | 185 | 504 |
| 8 | 0.96 | 0.50 | 0.50 | 0.50 | 0.40 | 0.01 | 99 | 96 | 250 | 507 |
| 9 | 0.96 | 0.30 | 0.70 | | | 0.01 | 99 | 76 | 135 | 505 |
| 10 | 0.87 | 0.91 | | 0.09 | | 0.01 | 101 | 96 | 175 | 503 |
| 11 | 0.87 | 0.82 | | 0.18 | | 0.01 | 101 | 84 | 155 | 503 |
| 12 | 0.87 | 0.91 | 0.045 | 0.045 | | 0.01 | 100 | 93 | 175 | 503 |
| 13 | 0.87 | 0.82 | 0.09 | 0.09 | | 0.01 | 106 | 101 | 180 | 503 |
| 14 | 0.96 | 0.80 | 0.10 | 0.10 | 0.40 | 0.01 | 98 | 95 | 240 | 507 |
| 15 | 0.78 | 0.80 | 0.10 | 0.10 | 0.40 | 0.01 | 95 | 90 | 230 | 508 |
| 16 | 0.96 | 0.45 | 0.45 | 0.10 | | 0.004 | 94 | 88 | 175 | 504 |
| 17 | 0.90 | 0.45 | 0.45 | 0.10 | | 0.01 | 102 | 80 | 135 | 504 |
| 18 | 0.92 | 0.45 | 0.45 | 0.10 | | 0.02 | 94 | 67 | 115 | 508 |
| 19 | 0.92 | 0.45 | 0.45 | 0.10 | 0.40 | 0.02 | 99 | 92 | 200 | 509 |
| 20 | 0.96 | 0.30 | 0.60 | 0.10 | 0.40 | 0.01 | 98 | 92 | 215 | 508 |
| 21 | 0.96 | 0.10 | 0.80 | 0.10 | 0.10 | 0.01 | 99 | 77 | 125 | 508 |
| 22 | 0.96 | 0.35 | 0.30 | 0.35 | 0.10 | 0.01 | 83 | 55 | 105 | 508 |
| B | 0.96 | | 1.00 | | | 0.01 | 29 | 26 | 95 | 511 |
| 23 | 0.96 | 0.10 | 0.90 | | | 0.01 | 58 | 40 | 95 | 509 |
| 24 | 0.96 | | 0.90 | 0.10 | 0.20 | 0.01 | 94 | 85 | 190 | 509 |
| 25 | 0.96 | 0.50 | 0.50 | | 0.80 | 0.01 | 87 | 86 | 305 | 505 |
| C | 0.96 | | | 1.00 | | 0.01 | 26 | 20 | 125 | 504 |
| 26 | 0.96 | | | 1.00 | 0.20 | 0.01 | 92 | 80 | 170 | 507 |
| 27 | 0.96 | | 0.10 | 0.90 | | 0.10 | 69 | 44 | 105 | 504 |
| 28 | 0.96 | | 0.10 | 0.90 | 0.20 | 0.01 | 100 | 79 | 140 | 507 |
| 29 | 0.95 | | 0.10 | 0.90 | 0.50 | 0.01 | 91 | 87 | 205 | 508 |
| 30 | 0.96 | 0.10 | | 0.90 | | 0.01 | 38 | 28 | 115 | 506 |
| 31 | 0.96 | 0.10 | | 0.90 | 0.20 | 0.01 | 94 | 77 | 145 | 507 |
| 32 | 0.96 | | 0.30 | 0.70 | | 0.01 | 60 | 38 | 105 | 506 |
| 33 | 0.96 | | 0.30 | 0.70 | 0.20 | 0.01 | 90 | 73 | 140 | 508 |
| 34 | 0.96 | 0.15 | 0.15 | 0.70 | | 0.01 | 49 | 34 | 110 | 508 |
| 35 | 0.96 | 0.15 | 0.15 | 0.70 | 0.20 | 0.01 | 90 | 72 | 140 | 510 |

Table I states the results of measurements on luminescent gallates according to the invention. The values of the coefficients $p$, $x$, $y$, $z$, $a$ and $b$ from the formula are given in the following columns for each example being denoted by a figure in the first column of the table. The examples denoted by A, B and C relate to the known manganese-activated gallates of magnesium, lithium and zinc, respectively. Furthermore the table states the relative light output upon excitation by radiation of a low-pressure mercury vapour discharge. The column $LO_{20}$ states the values for the light output if the luminescent gallate has a temperature of 20° C. and the column $LO_{80}$ states the light output at 80° C. The light output of the known magnesium gallate (Example A) at 20° C. is used as a measure for all other values of the light output and is fixed at 100. A further column of Table I states for each example the temperature ($T_{50}$) in ° C. at which the light output of the relevant luminescent material has decreased to 50% of the value at 20° C. The last column of the table states the location of the maximum of the emitted radiation in the spectrum ($\lambda_{max}$ in nm.).

TABLE II

| Example | $p$ | $x$ | $y$ | $z$ | $a$ | $b$ | $\eta_{CR}$ |
|---|---|---|---|---|---|---|---|
| 36 | 0.87 | 0.91 | 0.09 | 0 | 0 | 0.01 | 5.5 |
| 12 | 0.87 | 0.91 | 0.045 | 0.045 | 0 | 0.01 | 6.0 |
| 10 | 0.87 | 0.91 | 0 | 0.09 | 0 | 0.01 | 7.0 |
| 37 | 0.91 | 0.91 | 0.045 | 0.045 | 0 | 0.01 | 6.5 |
| 38 | 0.95 | 0.91 | 0.045 | 0.045 | 0 | 0.01 | 7.0 |

For the purpose of illustration Table II states the measured values of the energy conversion efficiency $\eta_{CR}$ upon excitation by electrons (20 kv.) for a few luminescent gallates according to the invention. The composition of the relevant gallates is given by the values of coefficients from the general formula.

EXAMPLE

To prepare the luminescent gallate according to Example 14 from Table I a mixture was made of 1.012 gms. (0.480 mol) $MgCO_3$
0.222 gms. (0.120 mol) $Li_2CO_3$
5.014 gms. (1.070 mol) $Ga_2O_3$
0.127 gms. (0.050 mol) $Al_2O_3$
0.029 gms. (0.010 mol) $MnCO_3$ This mixture was heated in air for approximately 2 hours in an Alundum crucible at a temperature of 1200° C. After cooling of the firing product thus obtained it was ground and sieved. Subsequently the firing product was again heated in air for approximately 2 hours at a temperature of approximately 1300° C. After cooling subsequent to the second heat treatment the reaction product was ground and sieved and again subjected to a heat treatment for 2 hours at 1400° C. The product thus obtained had only a very small luminescence upon excitation by ultraviolet radiation because the manganese was still not present in the desired condition of bivalent valence. To obtain this condition, the reaction product was subjected to a last thermal treatment by heating it for 1 hour at 1200° C. in a non-oxidising or a reducing atmosphere, for example, in an atmosphere comprising 98.4% of nitrogen and 1.6% of hydrogen. After cooling of the firing product thus obtained it was ground and sieved, if necessary. The product was then ready for use.

The luminescent gallates according to the other examples from Table I may be prepared similarly. The number of firing treatments and the firing temperature is then dependent on the reaction speed of the starting mixture to be used. In addition to carbonates, it is alternatively possible to use in the starting material oxides or compounds providing oxides upon heating.

It was shown with the aid of X-ray diffraction pictures that the luminescent gallates thus prepared according to the invention have the spinel structure.

The drawing shows in a graph the spectral energy distribution of the gallates according to Examples 2, 7, 21 and 28 from Table I upon excitation by the ultraviolet radiation from a low-pressure mercury vapour discharge. The energy of the emitted radiation per constant wavelength interval, E, is plotted in arbitrary units on the vertical axis. The wavelength is plotted in nm. on the horizontal axis. The broken-line curve A shows the spectral energy distribution of the known manganese-activated magnesium gallate (Example A from Table I). The maximum emission of the curve A is fixed at 100.

What is claimed is:
1. A bivalent manganese activated gallate phosphor having a spinel crystal structure and the formula:

$$p(Mg_xLi_{0.5y}Ga_{0.5y}Zn_zO) \cdot Ga_{2-a}Al_aO_3 \cdot bMnO$$

wherein $x+y+z=1$
$0 \leq a \leq 0.30$
$0.008 \leq b \leq 0.04$
$0.20 \leq x \leq 0.96$
$0 \leq y \leq 0.95$
$0 < z \leq 0.30$
$0.75 \leq p \leq 1.10$ and wherein zinc is present in an amount sufficient to improve the light output of said phosphor.

References Cited

UNITED STATES PATENTS

3,635,833  1/1972  Datta _____ 252—301.4 R

OTHER REFERENCES

Hoffman et al., "J. Inorg. Nucl. Chem.," vol. 30, pp. 63–79 (1968).

Brown, "J. Electrochem. Soc.," vol. 114, pp. 245–250 (1967).

OSCAR R. VERTIZ, Primary Examiner

J. COOPER, Assistant Examiner

U.S. Cl. X.R.
252—301.4 R